(12) United States Patent
Flores (10) Patent No.: US 8,646,980 B2
(45) Date of Patent: Feb. 11, 2014

(54) BEARING SHELL SEGMENT FOR INTERNAL COMBUSTION ENGINES OF VEHICLES

(75) Inventor: Denys Flores, Säo Paulo (BR)

(73) Assignees: MAHLE International GmbH, Stuttgart (DE); MAHLE Metal Leve S/A, Sao Paulo (BR)

( * ) Notice: Subject to any disclaimer, the term of this patent is extended or adjusted under 35 U.S.C. 154(b) by 73 days.

(21) Appl. No.: 13/383,927

(22) PCT Filed: Jul. 14, 2010

(86) PCT No.: PCT/BR2010/000225
§ 371 (c)(1),
(2), (4) Date: Mar. 21, 2012

(87) PCT Pub. No.: WO2011/006221
PCT Pub. Date: Jan. 20, 2011

(65) Prior Publication Data
US 2012/0177309 A1    Jul. 12, 2012

(30) Foreign Application Priority Data

Jul. 15, 2009 (BR) .................................... 0902385

(51) Int. Cl.
*F16C 33/66* (2006.01)
(52) U.S. Cl.
USPC ............ 384/288; 384/293; 384/294; 384/429
(58) Field of Classification Search
USPC .................. 384/286–290, 293, 294, 429, 430
See application file for complete search history.

(56) References Cited

U.S. PATENT DOCUMENTS

| 6,095,690 | A  | * | 8/2000  | Niegel et al.  | 384/293 |
| 6,491,438 | B1 | * | 12/2002 | Ono et al.     | 384/288 |
| 6,540,403 | B1 |   | 4/2003  | Damour         |         |
| 7,290,936 | B2 | * | 11/2007 | Tsuji et al.   | 384/293 |
| 8,075,192 | B2 | * | 12/2011 | Yamamoto et al.| 384/286 |
| 8,202,004 | B2 | * | 6/2012  | Koizuka et al. | 384/293 |
| 8,231,277 | B2 | * | 7/2012  | Morales Espejel et al. | 384/293 |
| 2003/0128903 | A1 | * | 7/2003 | Yasuda et al.  | 384/288 |

(Continued)

FOREIGN PATENT DOCUMENTS

JP    5-202936    8/1993
WO    WO 2007/031160    3/2007

OTHER PUBLICATIONS

International Search Report of PCT/BR2010/000225, Oct. 1, 2010.

*Primary Examiner* — Thomas R Hannon
(74) *Attorney, Agent, or Firm* — Collard & Roe, P.C.

(57) ABSTRACT

A bearing shell segment for internal combustion engines, composed of a body defining an inner surface that receives a coating and makes contact with a layer of lubricant oil film and an opposite outer surface, associable to a bearing, an inner surface having at least a first area substantially free from the compression load coming from the movement of the piston by the explosion of air-fuel mixture, and a second area which receives compression load coming from the movement of the piston by the explosion of air-fuel mixture. The first area has at least a surface portion to capture foreign particles present in the layer of lubricant oil film, the surface portion having cavities positioned so as to enable at least one foreign particle to be captured and withheld while moving towards the flow of lubricant oil, before reaching the second area.

10 Claims, 4 Drawing Sheets

(56) References Cited

U.S. PATENT DOCUMENTS

| | | |
|---|---|---|
| 2004/0228554 A1 | 11/2004 | Fujita et al. |
| 2005/0175263 A1 | 8/2005 | Nanbu et al. |
| 2008/0187259 A1 | 8/2008 | Ishigo et al. |

\* cited by examiner

BEARING SHELL SEGMENT FOR INTERNAL COMBUSTION ENGINES OF VEHICLES

CROSS REFERENCE TO RELATED APPLICATIONS

This application is the National Stage of PCT/BR2010/000225 filed on Jul. 14, 2010, which claims priority under 35 U.S.C. §119 of Brazilian Application No. PI0902385-2 filed on Jul. 15, 2009, the disclosure of which is incorporated by reference. The international application under PCT article 21(2) was published in English.

The present invention refers to a bearing shell segment idealized for use in internal combustion engines which comprises, in a region that does not receive compression load coming from the explosion movement of the pistons, cavities or holes, capable of capturing particles or residues carried by the lubricant oil. The present invention also refers to a bearing shell comprised of two segments, wherein at least one of them bears the innovative characteristics now described and defined.

DESCRIPTION OF THE STATE OF THE ART

The internal combustion piston engines essentially comprise an engine block (which comprises one or more cylinders and the crank axle combination or crankshaft combination) to which one or more cylinder heads are associated. The crankshaft combination is composed of pistons, connecting rods and the crankshaft.

The connecting rod is the part that connects the piston to the crankshaft and has the primary function of converting the alternative rectilinear movement of the piston inside the cylinder in a continuous angular movement of the crankshaft. The connecting rod is basically composed of a first widest part, body and the opposite end. The widest part is fixed to the crankshaft by means of screws, and the opposite end is fixed under the piston by the bolt. Some connecting rods have a head with an oblique connection, facilitating access during the assembly and disassembly of the engine.

When the engine is running, the piston(s) move(s) linearly and reciprocally. Solidarily to each piston, the respective connecting rod moves and its opposite end, associated to the crankshaft, describes a circular movement, causing angular movement of the crankshaft.

To provide for the correct working of the engine, contact between the crankshaft and the other components of the engine must be realized by way of bearings known by specialists in the art as bearing shells or con-rod bearings. Whatever its specific arrangement, however, they are known generically as sliding bearings.

In an internal combustion piston engine, the bearing shells or con-rod bearings can be used (i) as bearings of the crankshaft in relation to the engine block, (ii) as bearings of the connecting rod in relation to the crankshaft and (iii) as camshaft bearings, among other less commonplace applications.

Specifically, the bearings developed for use in the crankshaft are called bearing shells. In general, bearing shells are formed by two steel carcasses, in semicircular format (in order to facilitate assembly), coated internally with soft metal, having properties to reduce the attrition and embeddability of foreign particles.

The outer surface of a bearing shell has hardness characteristics that allow a solid contact with its accommodation, without deformation, guaranteeing its correct support and providing the correct dissipation of the heat generated by friction (attrition), thus avoiding overheating.

Further, the inner surface of the bearing shells has a coating that can be composed by various metallic alloys, such as, for example: copper or aluminum alloys, among others, always seeking resistant to abrasion and to wear and tear and good deformability, providing increased useful life even under the most severe engine operating conditions.

The reduction of attrition in internal combustion engines is an important aspect to be sought, because increasingly what is sought is low-displacement and more energy-efficient engines, raising the specific power output produced and overloading its internal components with greater stress, which need to be designed so as to support these efforts.

Additionally, the topography and the profile of the inner surface of the bearing shells has also become an increasingly more important aspect for improving the performance of the system. In this sense, various special techniques of finishing in bearing shells have been used with a view to achieving coatings that maximize the properties of reduced attrition, good lubrication capacity and increased durability.

One of the weaknesses of conventional bearing shells is that their inner coating can be damaged (scratched) by foreign bodies (particles) carried by the lubricant oil, due to the high compression forces at play. Since there is no cavity or recess, and also because of the non-existence of means for the particles to be quickly expelled, the durability of the part may be considerably decrease if, for example, the change of lubricant oil is postponed for too long.

In order to remedy this drawback, a series of bearing shells have been proposed, having grooves or orifices distributed along the region that receives compression load coming from the explosion movement of the pistons. These grooves have the function of directing foreign particles contained in the lubricant oil outwardly from the bearing, preventing them from causing damage or defects on the inner surface of the bearing shell, which, under extreme conditions, could cause a premature failure thereof.

Japanese patent document JP 5-202936 describes a hydrodynamic bearing shell for use in internal combustion engines, obviously having a portion that operates under load and respective opposite adjacent portions which do not operate under load.

Adjacently to the outflow region and in a region that does not sustain load, the bearing shell comprises a plurality of grooves to remove foreign particles present in the lubricant oil. The document also describes that the depth of said grooves decreases towards the portion that operates under load.

However, the solution proposed by this document does not prove to be efficient because instead of retaining the foreign particle, removing it from the lubricant oil, it merely expels it from the bearing shell. So, there is nothing to prevent the same particle, if it is not captured by the lubricant filter, from returning to the bearing shell or reaching another component of the engine, and may eventually damage it.

Another drawback of the solution proposed in this Japanese document lies in the fact that the grooves existing in the part require an increase in the flow of oil supplied by the pump so that the hydrodynamic support status of the bearing is possible. The greater flow leads to a greater power required by the oil pump, which needs to be absorbed from the operation of the engine, whereby decreasing the power available for use.

United States Patent Application Publication No. 2008/0187259 refers to a bearing shell for use in internal combustion engines, whose inner surface comprises two axial end recesses, located adjacently to the outflow area and interconnected to a radial recess that receives oil from the pump.

Due to the specific constitution of this bearing shell, eventual foreign particle present in the oil tends, with the rotation of the bearing in relation to the bearing shell, to go inside the radial recess and be led to one of the axial end recesses, from where it leaves the inner surface of the bearing shell.

As in the former discussed document, the solution presented is not very efficient, because instead of retaining the foreign particle, eliminating it from the lubricant oil merely leads it outside the bearing shell, returning it to the lubricant oil. Furthermore, the bearing shell described in this United States document also requires an increase in the flow of oil supplied by the pump so that the hydrodynamic support status of the bearing is possible. Increasing the power required for the operation of the oil pump.

For all the above, it is noted that there has not yet been developed a bearing shell for use in internal combustion engines that captures and retains foreign particles of the lubricant oil, avoiding damage or defects in the inner surface of the bearing shell, without causing collateral drawbacks such as the increase in the power absorbed by the oil pump and that the manufacturing costs is commercially viable.

OBJECTIVES OF THE INVENTION

The objective of the present invention is to provide a bearing shell segment for use in internal combustion engines having an inner surface formed with cavities capable of capturing foreign particles or residues carried by the lubricant oil, in a region that does not receive substantial compression loads coming from the explosion of the air-fuel mixture.

Further, the present invention, refers to a bearing shell which comprises at least a segment now sought.

BRIEF DESCRIPTION OF THE INVENTION

The objectives of the present invention are achieved by a bearing shell segment for internal combustion engines, composed of a body defining a inner surface that receives a coating and makes contact with a layer of lubricant oil film and an opposite outer surface associable to a bearing, the inner surface having at least a first part substantially free of the compression load coming from the movement of the piston by the explosion of air-fuel mixture and a second part that receives compression load coming from the movement of the piston by the explosion of air-fuel mixture, the first part having at least a surface portion to capture foreign particles present in the layer of lubricant oil film, the surface portion comprising a plurality of cavities positioned so as to enable at least one foreign particle to be captured and withheld by at least one of the cavities while moving towards the flow of lubricant oil, before reaching the second part.

Further, the objectives of the present invention are achieved by a bearing shell, which comprises at least a segment as defined above.

The above-mentioned characteristics, in addition to other aspects of the present invention, will be understood better by way of the examples and of the detailed description of the drawings that follow.

SUMMARY DESCRIPTION OF THE DRAWINGS

The present invention will now be described in greater detail based on an example of execution represented in the drawings. The drawings show.

DETAILED DESCRIPTION OF THE DRAWINGS

Figure 1:
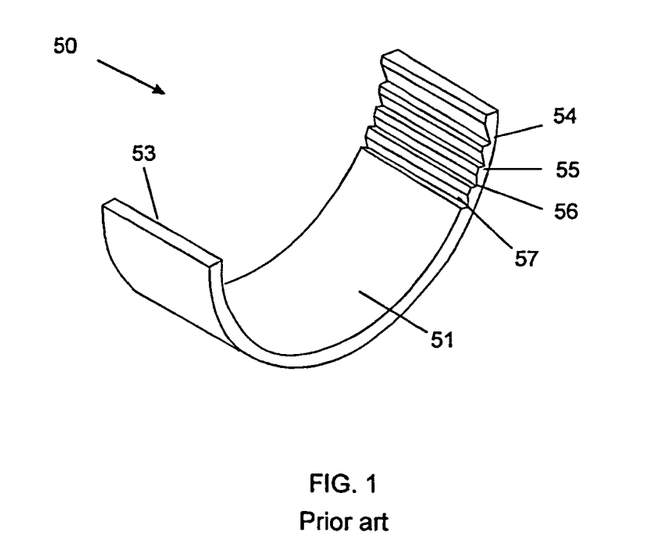
FIG. 1—is a perspective view of a bearing shell segment representative of the state of the art.

FIG. 1 illustrates a half, or segment, of a hydrodynamic bearing shell 50 for use in internal combustion engines representative of state of the art, having an inner surface divided into a portion 51 that operates under load (which sustains compression efforts resulting from the explosion of the air-fuel mixture and corresponding movement of the piston) and respective opposite adjacent portions 52,53 which do not operate under load and which are located adjacently to the outflow region (free ends of the bearing shell).

In the portions 52,53, the bearing shell 50 comprises a plurality of grooves 54-57 substantially transversal, or axial, to remove foreign particles present in the oil. The depth of said grooves decreases towards the portion that operates under load 51.

However, said solution is not very efficient, since the grooves 54-57 only direct the foreign particles outside the bearing shell, without capturing them. Therefore, said particles return to the lubricant oil, to the extent that it cannot be guaranteed that they will not return to the oil film that lubricates the bearing shell or any other engine component.

Another drawback relating to the bearing shell of the state of the art illustrated in FIG. 1 is the excessive volume of the grooves 54-57, that demands a high quantity of lubricant oil in order to meet and enable the correct effect of hydrodynamic bearing, avoiding the metal-metal contact of the turning axle with the bearing shell.

This large quantity of oil necessary to guarantee the hydrodynamic bearing effect requires an oil pump with large capacity/flow, which has the drawback of greater consumption of power of the engine in order to drive it and, at least theoretically, an increase in oil pressure sent to the other parts of the engine, such as, for example, the high parts (head and valve train).

As a general rule, in increase in oil pressure needs to be correctly equated because, as it is known by persons skilled in the art, the working of some of the components of the engine, such as hydraulic valve tappets, may be impaired in situations of excessive oil pressure.

Figure 2:
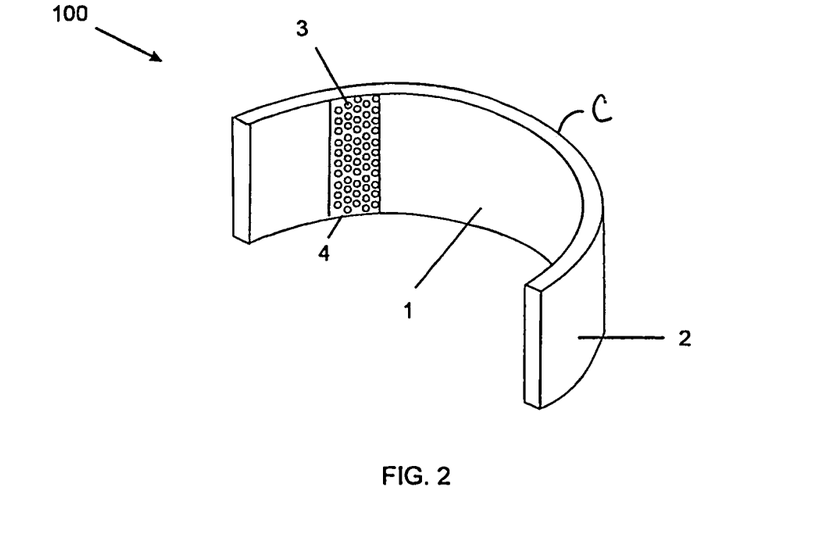
FIG. 2—is a perspective view of the bearing shell segment that is the object of the present invention.

FIG. 2 illustrates the hydrodynamic bearing shell segment 100 of the present invention, having a body C with substantially semicircular format defining a first inner surface 1 and a second outer surface 2. The inner surface 1 has any coating that provides resistance to abrasion and to the wear and tear and good deformability, providing high useful life even under the most severe operating conditions of the engine.

The inner surface 1 also presents at least a surface portion 3 having a plurality of cavities 4, the function of which will be explained later. The outer surface 2 can be made of any necessary or desirable metallic material. In the same way, the coating of the inner surface 1 may vary considerably without meaning the resulting invention will stray from the scope of protection of the appended claims.

The inner surface 1 is the one that makes contact with the lubricant oil film when the segment 100 is mounted and in operation, whereas the outer surface 2 is the one facing the static bearing itself, such as, for example, the bearing present in the engine block in the case of a crankshaft.

The bearing shell is formed by two segments 100 positioned one opposite the other, so as to define a circular opening for positioning. In the case of the bearing shell that is the object of the present invention, at least one of the segments should have the aforementioned plurality of cavities 4. The segment 100 presents an axial length measurement illustrated in FIG. 3 numbered 101.

Figure 4:
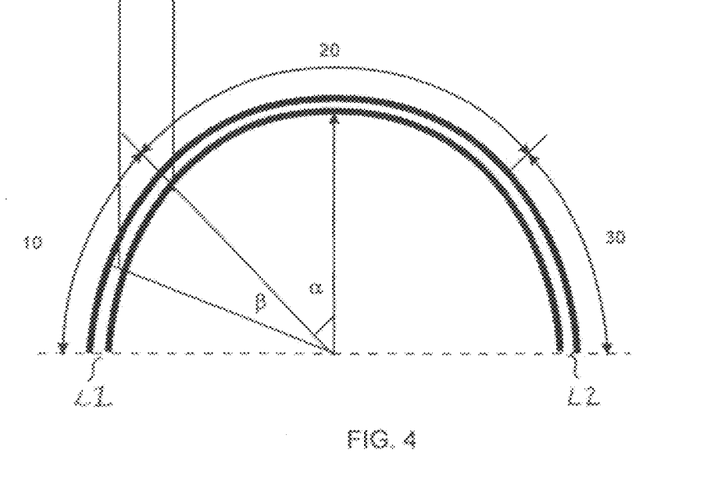
FIG. 4—is a side view of the shell segment illustrated in FIGS. 2 and 3.

Based on FIG. 4, the shell segment 100 can be hypothetically divided into three main parts, wherein a first part (illustrated as 10) adjacent to a first free end of the segment, a second part 20 substantially intermediary and a third part 30, adjacent to a second free end of the segment 100.

In simplified terms, it can be said that the first part 10 extends for about 45 degrees counted from the first free end of the segment L1, the second part 20 extends consecutively for 90 degrees and, lastly, the third part 30 extends for the final 45 degrees, up to the second free end L2 of the segment. Obviously, there can be countless variations without meaning that the resulting invention strays from the scope of protection of the claims.

Preferably, the second part 20 of the segment, which is the one positioned substantially centrally, is subject to the load caused by the movement of the piston when the air-fuel mixture explodes (it being, therefore, a loaded part). Parts 10 and 30, therefore, correspond to the regions of the segment 100 which do not sustain the effort coming from the explosion of the air-fuel mixture (non-loaded parts).

As can also be seen from an analysis of FIGS. 3 and 4, the surface portion 3 having a plurality of cavities 4 is positioned in the first part 10 of the segment, that is, in a non-loaded region, this being an essential condition for the correct working of the invention, as described later.

Obviously, the positioning of the portion of the bearing shell subject to the loading can vary freely. In certain engines, chiefly those that operate according to the Diesel cycle, the positioning of the shell segment in the connecting rod is inclined. In this type of arrangement, the area of the segment that sustains the efforts coming from the explosion of the air-fuel mixture is not located in the central portion, but rather adjacently to one of the ends. Therefore, in the case of a shell segment that is the object of the present invention idealized to operate in an engine thus configured, the surface portion 3 having a plurality of cavities 4 would be positioned in a region where there is no loading, which would possible be different from the region of the segment illustrated in FIG. 4.

Essentially, the positioning of the surface portion 3 having a plurality of cavities 4 may vary freely in the segment, provided it is positioned outside the loaded region and that the particularity is observed concerning the flow of oil, which will be described next.

Preferably, the surface portion 3 is positioned at an angle $\alpha$ which, depending of the characteristics of the engine, may vary from 10 to 60 degrees from the center of the segment (preferably, 45 degrees) and the end of the surface portion 3 is positioned at an angle $\beta$ from the angle $\alpha$ which can be from 1 to 30 degrees (preferably, 15 degrees).

Figure 3:
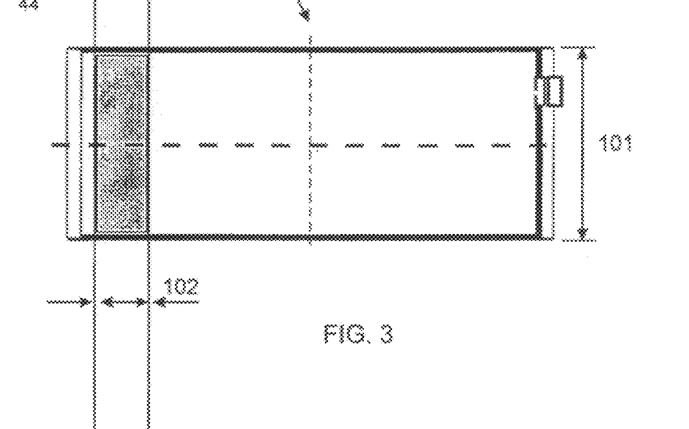
FIG. 3—is a flat plan view of the bearing shell segment illustrated in FIG. 2.

Further preferably, the surface portion 3 presents a given width 102 and extends for the entire axial length 101 of the shell segment 100, as can clearly be seen in FIG. 3. However, it is possible to conceive a segment 100 according to the teachings of the present invention and included in the scope of protection of the claims, in which the surface portion 3 presents an axial length lower than the axial length axial 101 of the segment.

It is important to note that whatever the preferred position of the surface portion having cavities 4, it should be positioned adjacently to the feed of pressurized oil and before the load region, considering the flow of lubricant in the segment 100.

When an axle rotates inside the cavity substantially formed by the two bearing shell segments, it naturally drags lubricant oil towards its rotation. The oil existing therein is constantly fed under pressure by the pump so that there is hydrodynamic support for the axle, that is, so that the axle is supported on the oil without touching the bearing shell segments (which would cause severe wear and tear of these components).

With a view to optimizing the working of the system, the segment 100 is designed in such a way that the lubricant oil is fed adjacently to the first free end L1 and moved longitudinally through its inner surface until it leaves the shell segment in the second free end L2.

Figure 5:
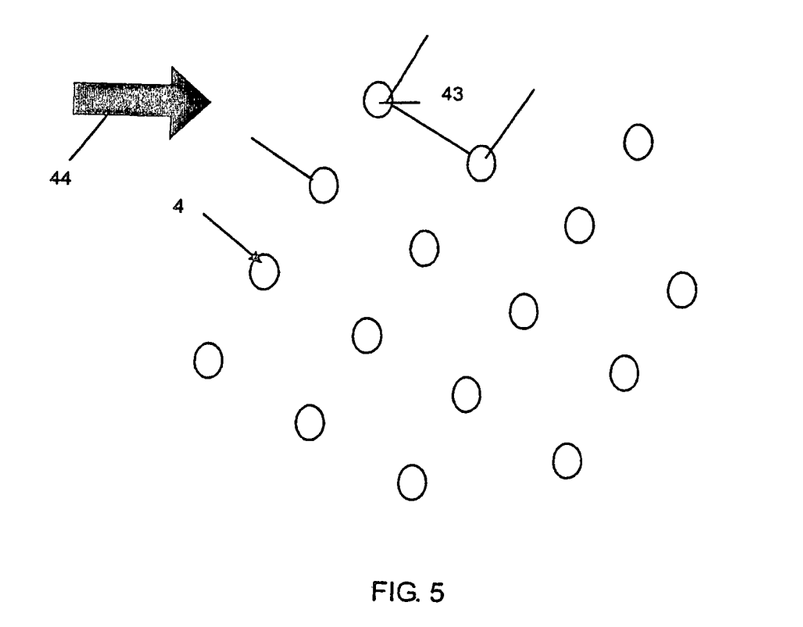
FIG. 5—is a schematic illustration of the surface portion of the shell segment that is the object of the present invention, in which the cavities are positioned to capture and retain particles present in the lubricant oil.

Obviously, to optimize the lubrication conditions, the rotation of the axle is such that it rotates in the sense 44, from L1 to L2, accompanying the inner surface of the segment 100 and allowing the flow of lubricant oil, jointly with the pump (see FIGS. 3 and 5).

Considering the flow of lubricant oil, the surface portion having cavities 4 should be positioned in a non-leaded region and substantially adjacently to the local where the oil is fed into the segment 100, in order to allow for any metallic to traverse it before reaching the loaded region of the bearing shell.

In this regard, it is well known by persons skilled in the art that when a foreign particle that reaches the shell segment via lubricant oil and exposed to high compression forces in the loaded region, it may occur (and does in fact occur in many cases) that a particle becomes embedded and permanently adheres to the inner surface. Over time, foreign particles potentially embedded in the inner surface of the segment may lead the bearing to premature failure due to fatigue or scuffing, and may also scratch the axle. Said situation is progressively worse in accordance with the negligence in the time interval for changing the oil and/or the severity of use to which the engine is subject.

This is why the shell segment 100 comprises the aforementioned portion with cavities 4 positioned adjacently to the surface oil feed and, always thinking towards the oil flow, before the loaded region.

Therefore, in the segment 100 that is the object of the present invention, the oil film reaches the inner surface and flows, both by the pressure exercised by the pump and the circular movement of the axle. On its path, the oil traverses the portion with cavities 4 before reaching the loaded region and any particles are 'captured' by the cavities 4, thus preventing them from reaching the loaded region and end up adhered to the inner surface of the segment in the loaded region. The positioning of the cavities is such that the pressure in the oil film in that site is sufficient to assist in capturing the particles by the cavities.

With this, the present invention guarantees that the particles do not return to circulate in the lubricant oil, thus avoiding that in the future they reach this or other points of the engine and abbreviate its useful life in some way.

In order to facilitate the capture and adherence of the particles, the cavities can assume various formats. Preferably, the cavities 4 are produced by the process of Laser Surface Texturization, but may be produced by another process, provided they achieve the same end result.

FIG. 5 shows the surface portion 3 having cavities 4 with a given distance between themselves (see number 43) and also in the direction of rotation of the axle 44 (and, by consequence, of the oil flow) through the segment 100. The cavities 4 are positioned such that when a foreign particle moves towards the flow of lubricant oil, it finds at least a cavity 4 capable of capturing it and retaining it, whatever its trajectory (either perfectly rectilinear or oblique).

Figure 6:
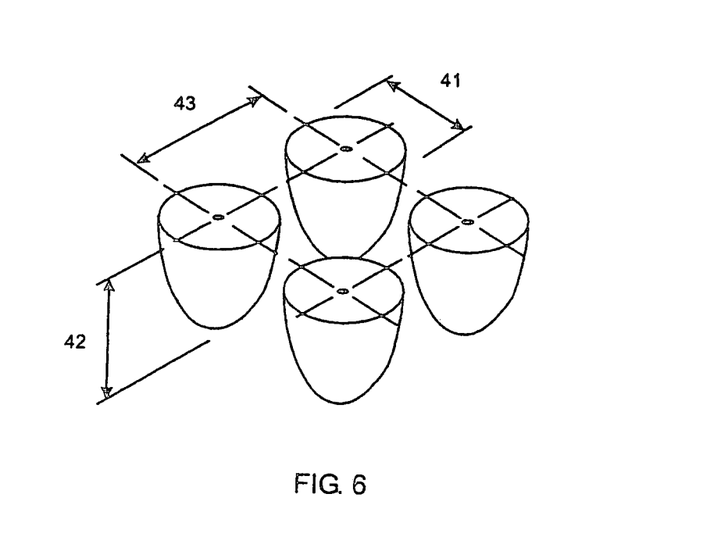
FIG. 6—is a perspective illustration of the detail of the cavities illustrated schematically in FIG. 5.
Figure 7:
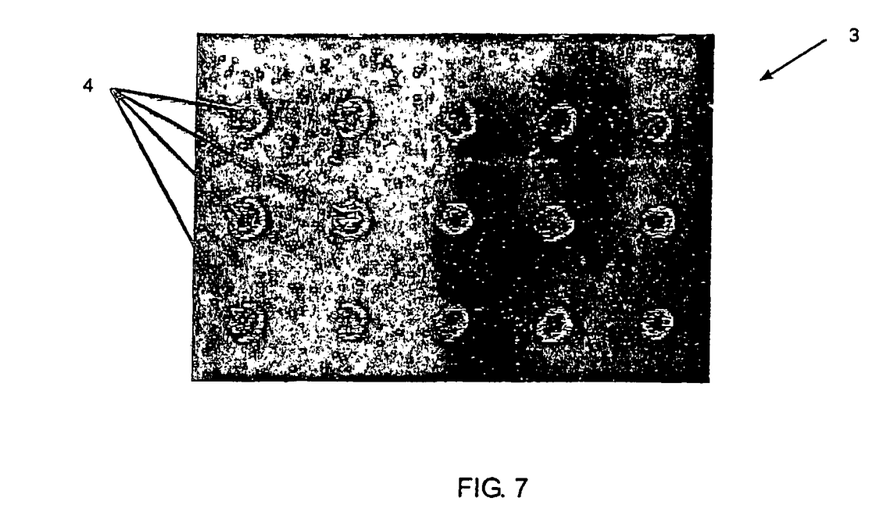
FIG. 7—is a micrography of the surface of the cavities increased 100 times.
Figure 8:
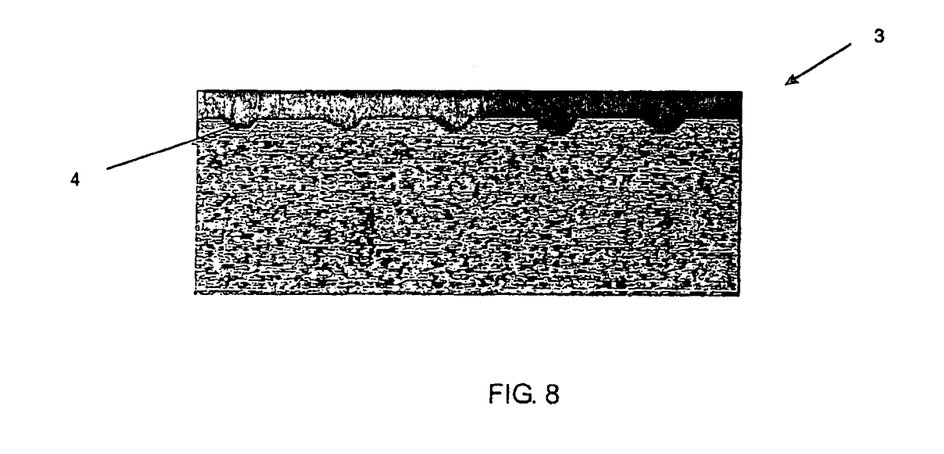
FIG. 8—is a micrography of a cut of the bearing shell segment in the region of the surface of the cavities, illustrating them.

Preferably, and as can be seen in FIG. 6, the cavities 4 have a diameter 41 comprised between 10 and 300 μm (typically 100 μm), depth 42 comprised between 10 and 200 μm, (normally 50 μm) and also a distance between centers 43 comprised between 20 and 500 μm, normally 200 μm. These characteristics and arrangement guarantee a greater efficiency in the capture of the foreign particles from the oil film. However, efficient results can also be obtained with other characteristics.

Additionally, it is not compulsory that the cavities be equidistant between themselves.

The positioning of the portion with cavities 4, combined with the diameter 41 and distribution of the cavities, allows that, if a foreign particle is between the bearing shell and the axle of rotation, in the direction of rotation of the axle 44 and the flow of oil, its trajectory finds at least a cavity 4 and consequently this particle may be captured, preventing it from continuing its movement to the loaded region.

When capturing any foreign particles, the segment 100 avoids superficial damage or, under extreme circumstances, its premature failure.

It is obvious, however, that the cavities may have any other format and/or be positioned in any other way, equidistantly between themselves or not, provided that efficient results are obtained.

It is also important to note that a bearing shell, composed by two segments, where at least one of them presents the innovative characteristics of the segment 100 now defined, is a new and inventive invention and is included in the scope of the claims appended hereto.

Having described an example of preferred embodiment, it should be understood that the scope of the present invention encompasses other possible variations, being limited only by the content of the claims appended hereto, potential equivalents being included therein.

The invention claimed is:

1. Bearing shell segment (100) for internal combustion engines, composed of a body (C) defining an inner surface (1) that receives a coating and makes contact with a layer of lubricant oil film and an opposite outer surface (2), associable to a bearing, the inner surface (1) having at least a first area (10) substantially free from a compression load from a movement of a piston by explosion of an air-fuel mixture and a second area (20) that receives compression load coming from the movement of the piston by the explosion of air-fuel mixture, the first area (10) having at least a surface portion (3) to capture foreign particles present in the layer of lubricant oil film, wherein the surface portion (3) comprises a plurality of cavities (4) positioned so as to enable at least one foreign particle to be captured and retained by at least one of the cavities (4) while moving towards the flow of lubricant oil, before reaching the second area (20).

2. Bearing shell segment according to claim 1, wherein the distance (43) between the centers (c) of the cavities (4) is comprised between 20 and 500 μm.

3. Bearing shell segment according to claim 1, wherein the cavities (4) having a distance (43) between the centers of 200 μm.

4. Bearing shell segment according to claim 1, additionally comprising a third area (30) also substantially free of the compression load from the movement of the piston by the explosion of air-fuel mixture.

5. Bearing shell segment according to claim 1, wherein the surface portion (3) extends for the entire axial length (101).

6. Bearing shell segment according to claim 1, wherein the surface portion (3) is positioned at an angle α varying from 10 to 60 degrees from the center.

7. Bearing shell segment according to claim 6, wherein the end of the surface portion (3) is positioned at an angle β, from angle α, which can be from 1 to 30 degrees.

8. Bearing shell segment according to claim 1, wherein the cavities (4) have a diameter (41) comprised between 10 and 300 μm.

9. Bearing shell segment according to claim 1, wherein the cavities (4) have a depth (42) comprised between 10 and 200 μm.

10. Bearing shell, comprising at least a segment (100) as defined in claim 1.

* * * * *

UNITED STATES PATENT AND TRADEMARK OFFICE
CERTIFICATE OF CORRECTION

PATENT NO. : 8,646,980 B2  Page 1 of 1
APPLICATION NO. : 13/383927
DATED : February 11, 2014
INVENTOR(S) : Denys Flores It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 138 days.

Signed and Sealed this

Twenty-ninth Day of September, 2015

Michelle K. Lee
*Director of the United States Patent and Trademark Office*